(12) United States Patent　　(10) Patent No.: US 9,234,329 B2
Jaliwala et al.　　(45) Date of Patent: Jan. 12, 2016

(54) ADAPTIVE CONTROL SYSTEM AND METHOD FOR MACHINE IMPLEMENTS

(71) Applicant: Caterpillar Inc., Peoria, IL (US)

(72) Inventors: Salim Jaliwala, Peoria, IL (US); Yanchai Zhang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 49 days.

(21) Appl. No.: 14/185,955

(22) Filed: Feb. 21, 2014

(65) Prior Publication Data

US 2015/0240453 A1　Aug. 27, 2015

(51) Int. Cl.
　　*E02F 9/20*　　　(2006.01)
(52) U.S. Cl.
　　CPC .................... *E02F 9/2041* (2013.01)
(58) Field of Classification Search
　　CPC ......... E02F 3/487; E02F 3/844; E02F 9/2037; A01B 69/004
　　USPC .............. 701/50, 505, 422; 340/870.16, 685; 37/348, 417; 172/4.5, 1
　　See application file for complete search history.

(56) References Cited

U.S. PATENT DOCUMENTS

| 4,820,041 | A | * | 4/1989 | Davidson et al. ............ 356/3.12 |
| 5,493,494 | A | * | 2/1996 | Henderson ....................... 701/50 |
| 5,631,658 | A | * | 5/1997 | Gudat et al. ................... 342/457 |
| 6,655,465 | B2 | | 12/2003 | Carlson et al. |
| 6,845,311 | B1 | | 1/2005 | Stratton et al. |
| 7,121,355 | B2 | | 10/2006 | Lumpkins et al. |
| 7,970,519 | B2 | | 6/2011 | Green |
| 2002/0134559 | A1 | * | 9/2002 | Newnam ........................ 172/817 |
| 2004/0210357 | A1 | * | 10/2004 | McKay et al. ................... 701/23 |
| 2006/0231371 | A1 | * | 10/2006 | Moliere et al. ........... 198/341.09 |
| 2008/0177449 | A1 | | 7/2008 | Pickett et al. |
| 2012/0000681 | A1 | | 1/2012 | Douglas |

* cited by examiner

*Primary Examiner* — Marthe Marc-Coleman (57) ABSTRACT

An adaptive control system for a machine implement is provided. The adaptive control system includes a machine implement of a machine and an adaptive controller operatively coupled to the machine implement. The adaptive controller includes a processor configured to receive a position of the machine implement relative to a terrain from at least one position detection system, receive data regarding operating conditions of the terrain, compare the position with a target position stored in a memory, compare the data regarding the operating conditions with data stored in a reference model of the terrain stored in the memory, and adjust the position of the machine implement based upon the comparisons and based upon an updated reference model of the operating conditions of the terrain.

16 Claims, 6 Drawing Sheets

Bench Testing

FIG. 5

On Machine Stationary Tuning with Step Changes

FIG. 6

CONTROL TUNING WITH MOVING TEST
FIG. 7

FIG. 8

ADAPTIVE CONTROL SYSTEM AND METHOD FOR MACHINE IMPLEMENTS

TECHNICAL FIELD

This patent disclosure relates generally to control systems and methods, and more particularly, to an adaptive control system and method for controlling positioning of machine implements.

BACKGROUND

Conventional earthmoving or geography altering machines such as track type tractors, motor graders, scrapers, and/or backhoe loaders, have an implement such as a dozer blade or bucket, which is used on a worksite in order to alter a geography or terrain of a section of earth. The implement may be controlled by an operator or by an autonomous grade control system to perform work on the worksite. For example, the operator may move an operator input device that controls the movement or positioning of the implement using one or more hydraulic actuators. To achieve a final surface contour or a final grade, the implement may be adjusted to various positions by the operator or the grade control system.

Positioning the implement, however, is a complex and time-consuming task that requires expert skill and diligence if the operator is controlling the movement. Conventional machines deploy proportional (P), proportional-derivative (PD), proportional-integral (PI), and/or proportional-integral-derivative (PID) controllers to attain position control of various machine implements. Such controllers may be deployed in combination with a Global Positioning System (GPS) receiver on the machine. One such conventional machine control system utilizing a GPS is disclosed in U.S. Pat. No. 6,655,465.

However, such conventional P/PD/PI/PID controllers require frequent retuning of control gain parameters and are not very adaptive to changes in the operating conditions of the terrain or other parameters used in efficient grade control. For example, for each new type of terrain, prior to operation, the controller gain parameters have to be changed for that particular terrain. Such frequent retuning increases latency and requires manual intervention, which increases the operating costs.

SUMMARY

In one aspect, an adaptive control system for a machine implement is provided. The adaptive control system includes a machine implement of a machine and an adaptive controller operatively coupled to the machine implement. The adaptive controller includes a processor configured to receive a position of the machine implement relative to a terrain from at least one position detection system, receive data regarding operating conditions of the terrain, compare the position with a target position stored in a memory, compare the data regarding the operating conditions with data stored in a reference model of the terrain stored in the memory, adjust the position of the machine implement based upon the comparisons and based upon an updated reference model of the operating conditions of the terrain.

In another aspect, an adaptive control method for a machine implement is provided. The adaptive control method includes receiving, at an adaptive controller, a position of the machine implement relative to a terrain from at least one position detection system. The adaptive control method includes receiving, at the adaptive controller, data regarding operating conditions of the terrain. The adaptive control method includes comparing, at the adaptive controller, the position with a target position stored in a memory. The adaptive control method includes comparing, at the adaptive controller, the data regarding the operating conditions with data stored in a reference model of the terrain stored in the memory. The adaptive control method includes adjusting, at the adaptive controller, the position of the machine implement based upon the comparisons and based upon an updated reference model of the operating conditions of the terrain.

In yet another aspect, an adaptive controller including a processor and a memory coupled to the processor is provided. The memory includes computer executable instructions thereupon. The computer executable instructions when executed by the processor cause the processor to receive a position of a machine implement relative to a terrain from at least one position detection system, receive data regarding operating conditions of the terrain, compare the position with a target position stored in the memory, compare the data regarding the operating conditions with data stored in a reference model of the terrain stored in the memory, and adjust the position of the machine implement based upon the comparisons and based upon an updated reference model of the operating conditions of the terrain.

DETAILED DESCRIPTION

Figure 1:
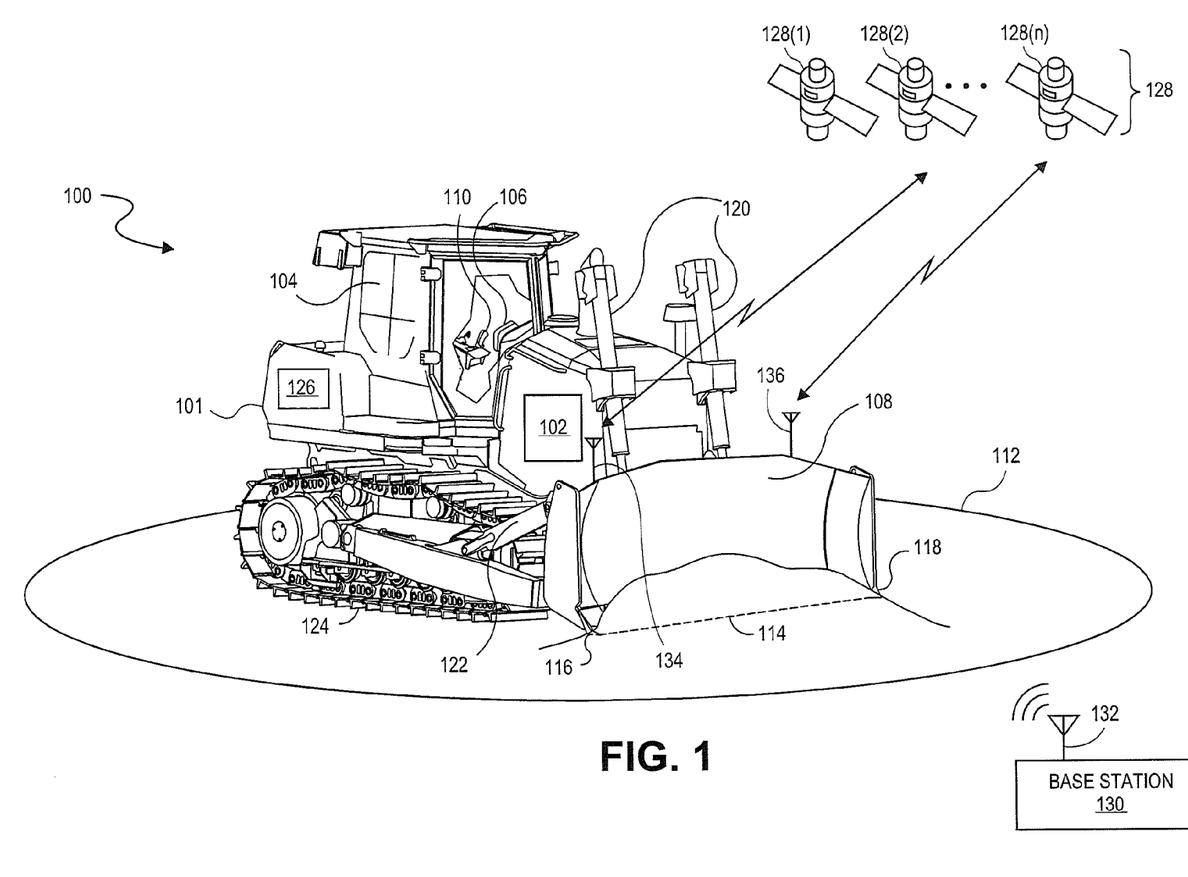
FIG. 1 illustrates an adaptive control system for machine implements, in accordance with an aspect of this disclosure.

Now referring to the drawings, wherein like reference numbers refer to like elements, there is illustrated in FIG. 1 an exemplary aspect of an adaptive control system 100. In one aspect, the adaptive control system 100 includes a machine 101. In one aspect, the machine 101 is operating on a worksite 112 and is in communication with a base station 130 and a global navigation satellite system (GNSS) 128. The machine 101 may be a mobile machine that performs operations associated with industries such as mining, construction, farming, transportation, landscaping, or the like. For example, the machine 101 may be a track type tractor or dozer, as depicted in FIG. 1, a motor grader, or other earth-moving machine known in the art. While the following detailed description describes an exemplary aspect in connection with a track type tractor, it should be appreciated that the description applies equally to the use of the present disclosure in other machines. Further, the adaptive control system 100 may include any number of machines and FIG. 1 illustrates only one machine 101 by way of example only and not by way of limitation.

In one aspect, the machine 101 includes a power source 102 and an operator's station or cab 104. The machine 101 further includes a machine implement 108, interchangeably referred to herein as an implement 108. Examples of the machine implement 108 may include a blade or a shovel for moving earth in the worksite 112. The cab 104 may include a user interface 110 necessary to operate the machine 101. The user interface 110 may be provided along with or may include, for example, one or more displays 106. The user interface 110 may be configured to propel the machine 101 and/or to control other machine components. The user interface 110 may include one or more joysticks provided within the cab 104, and adapted to receive input from an operator indicative of a desired movement of the implement 108. For simplification purposes, only one operator input device or user interface 110 illustrated as a joystick will be discussed and shown in the figures. The display 106 may be configured to convey information to the operator and may include a keyboard, touch screen, or any suitable mechanism for receiving input from the operator to control and/or operate the machine 101, the implement 108, and/or the other machine components.

The machine implement 108 may be adapted to engage, penetrate, or cut the surface of a worksite 112 and may be further adapted to move the earth to accomplish a predetermined task. The worksite 112 may include, for example, a mine site, a landfill, a quarry, a construction site, a golf course, or any other type of worksite having an associated terrain. Moving the earth may be associated with altering the geography at the worksite 112 and may include, for example, a grading operation, a scraping operation, a leveling operation, a material removal operation, or any other type of geography altering operation at the worksite 112. In one aspect, the terrain of the worksite 112 has operating conditions associated therewith. Such operating conditions may be described using parameters such as a type of material making the terrain, a dryness factor of the terrain, one or more disturbances present in the terrain (e.g., waves, undulations, or uneven surfaces), and/or other geographical patterns of the terrain of the worksite 112, and the like.

In the illustrated aspect, the implement 108 includes a cutting edge 114 that extends between a first end 116 and a second end 118. The first end 116, of the cutting edge 114 of the implement 108, may represent a right tip or right edge of the implement 108 and the second end 118, of the cutting edge 114 of the implement 108, may represent a left tip or left edge of the implement 108. In one aspect, the implement 108 may be moveable by one or more hydraulic mechanisms operatively connected to the user interface 110 provided in the cab 104.

The hydraulic mechanisms may include one or more hydraulic lift actuators 120 and one or more hydraulic tilt actuators 122, for moving the implement 108 to various positions, such as, for example, lifting the implement 108 up or lowering the implement 108 down, and tilting the implement 108 left or right. In the illustrated embodiment, the machine 101 includes one hydraulic lift actuator 120 and one hydraulic tilt actuator 122 on each side of the implement 108. The illustrated aspect shows two hydraulic lift actuators 120, but only one of the two hydraulic tilt actuators 122 is shown (only one side shown). Moreover, the hydraulic mechanism may also include one or more hydraulic push cylinders (not shown) for pitching the implement 108 in forward or backward direction. In one aspect, the hydraulic tilt actuators 122 and the one or more hydraulic lift actuators 120 may be configured to swivel the machine implement 108. Alternatively, in one aspect, the machine 101 may include additional hydraulic actuators to swivel the machine implement 108 over a range of solid angles.

The power source 102 may be an engine that provides power to a ground engaging mechanism 124 adapted to support, steer, and propel the machine 101. In one aspect, the power source 102 may provide power to actuate the hydraulic mechanism to move or position the machine implement 108. The power source 102 may embody an engine such as, for example, a diesel engine, a gasoline engine, a gaseous fuel-powered engine, or any other type of combustion engine known in the art. It is contemplated that the power source 102 may alternatively embody a non-combustion source of power (not shown) such as, for example, a fuel cell, a power storage device, or another suitable source of power. The power source 102 may produce a mechanical or electrical power output that may be converted to hydraulic power for providing power to the ground engaging mechanism 124, the implement 108, the hydraulic tilt actuators 122, the one or more hydraulic lift actuators 120, and to other machine components.

The machine 101 may include other known components such as vehicular parts including tires, wheels, transmission, engine, motor, hydraulic systems, suspension systems, cooling systems, fuel systems, exhaust systems, chassis, ground engaging tools, imaging systems, and the like (not shown). Further, the machine 101 may be movable along different directions for the machine implement 108 to implement a predetermined grade on the terrain of the worksite 112.

In one aspect, the adaptive control system 100 includes an adaptive controller 126. In one aspect, the adaptive controller 126 is operatively coupled to or connected to the machine implement 108. In one aspect, the adaptive controller 126 may be coupled to the machine implement 108 the hydraulic lift actuators 120 and the hydraulic tilt actuators 122 for controlling movement of the implement 108. The adaptive controller 126 may be operatively coupled to the user interface 110 to effectuate the movement and/or positioning of the machine 101 and/or the machine implement 108. In one aspect, the adaptive controller 126 is removeably attached to the machine 101. For example, the adaptive controller 126 may latch on to a port in the machine 101 and carry out the features and functionalities of the various aspects discussed herein using input-output interfaces (not shown). In one aspect, the adaptive controller 126 may be a standalone controller or module that can be fitted or retrofitted to different machines, and not just to the machine 101. Such removability of the adaptive controller 126 may, for example, aid in servicing the adaptive controller 126 as and when needed (e.g., when the machine 101 is not in operation). The adaptive controller 126 is "adaptive" in terms of adapting the functioning of the machine 101 with respect to various operating conditions in which the machine 101 may be used and to the changing system dynamics. In one aspect, the adaptive controller 126 is "adaptive" such that controller gains of the adaptive controller 126 are modified or adapted according to changing operating conditions and dynamics of the worksite 112 as well as parameters associated with the different loads and speeds of the machine 101. In one aspect, the term "adaptive" as used with respect to the adaptive controller 126 relates to a dynamic system with real-time or dynamic parameter estimation for the operating conditions of the worksite 112, the term "real-time" or "dynamic" being related to when the machine 101 is being operated on the worksite 112. The adaptive controller 126 may be configured to estimate uncertain plant/controller (e.g., machine 101/adaptive controller 126) parameters in real-time dynamically while using the measured signals in the adaptive control system 100 or use estimated parameters in control input computations performed, for example, by a processor 202 (discussed, e.g., with respect to FIG. 2). The measured signals may be provided by a sensor module 208 and/or a position detection system 210, or both (discussed, e.g., with respect to FIG. 2). The adaptive controller 126 may include a control law and a state prediction model, as discussed with respect to FIG. 2. In one aspect, the adaptive controller 126 is an L1-type adaptive controller configured to update a reference model 206 (discussed, for example, with respect to FIG. 2) using an L1 norm associated with a plurality of positions of the machine implement 108 for different operating conditions and parameters. The adaptive controller 126 is configured to compare the data regarding the operating conditions of the terrain with reference operating conditions using the L1 norm, and then update the reference model 206 automatically for changing operating conditions and control parameters (as discussed with respect to FIGS. 2 and 3, for example). It is to be noted that although the L1 norm is being discussed herein, the adaptive controller 126 may be an $L_k$ type adaptive controller where k is an integer in the range $[1, \infty]$, as may be understood by one of ordinary skill in the art in view of the present disclosure. In one aspect, the adaptive controller 126 may be used to implement various adaptive control schemes, including but not limited to, open loop adaptive control, direct adaptive control, indirect adaptive control, etc. By way of example only, the adaptive controller 126 is an integrated circuit (IC) chip that is fabricated to implement various features and functionalities of the aspects discussed herein. By way of example only and not by way of limitation, the adaptive controller 126 may be fabricated using a Complementary Metal Oxide Semiconductor (CMOS) fabrication technology. In one aspect, the adaptive controller 126 may be implemented as an Application Specific Integrated Circuit (ASIC), a Field Programmable Gate Array (FPGA), a System-on-a-Chip (SOC), or the like. In one aspect, the adaptive controller may be a printed circuit board (PCB) with individual components (discrete as well as ICs), as discussed with respect to FIG. 2.

Although not illustrated, machine 101 may include a grade control system. The adaptive controller 126 is adapted to receive inputs from the user interface 110 and/or the grade control system to control the movement of the machine implement 108 based, for example, on the loading condition of the machine implement 108, the machine speed, and the position of the machine implement 108 individually or collectively in pre-determined combinations. The grade control system may include one or more control modules (e.g. Electronic Controller Modules (ECMs), Electronic Controller Units (ECUs), etc.). The one or more control modules may include processing units, memory, sensor interfaces, and/or control signal interfaces (for receiving and transmitting signals). The processing units may represent one or more logic and/or processing components used by the adaptive controller 126 to perform certain communications, control, and/or diagnostic functions. For example, the processing units may be adapted to execute routing information among devices within and/or external to the adaptive controller 126.

In one aspect, the machine 101 includes a first antenna 134 and a second antenna 136 on the machine implement 108, although the first antenna 134 and/or the second antenna 136 may be elsewhere on the machine 101. In one aspect, the first antenna 134 and the second antenna 136 may be communicatively coupled to the adaptive controller 126. In one aspect, the first antenna 134 and the second antenna 136 may be communicatively coupled to the position detection system 210 (discussed, for example, with respect to FIG. 2). Such a position detection system 210 may be part of the adaptive controller 126 or may be a separate device on the machine 101. In one aspect, the first antenna 134 and the second antenna 136 may be configured to provide precise positioning signals regarding a position of the machine implement 108 relative to an instantaneous terrain of the worksite 112, e.g., up to an accuracy of ±1 cm. In one aspect, the first antenna 134 and the second antenna 136 may be part of a dual global positioning system (dual-GPS) that is in communication with the GNSS 128. In one aspect, only one of the first antenna 134 and the second antenna 136 may be used. Alternatively, additional antennas may be used. By way of example only and not by way of limitation, the first antenna 134 and the second antenna 136 may communicate with an on-chip antenna on the adaptive controller 126. By way of example only and not by way of limitation, such a chip antenna may be the "GPS/GLONASS SMD Chip Antenna" provided by Johanson Technology, Inc. of Camarillo, Calif.

The GNSS 128 used by the position detection device on the machine 101 includes one or more satellites 128(1)-128(n), where 'n' is a positive integer. The GNSS 128 may communicate with additional components such as a base station 130, communication towers, etc. that form the communication infrastructure for the GNSS 128. The GNSS 128 may be a Global Positioning System (GPS), a differential GPS, a Global'naya Navigatsionnaya Sputnikovaya Sistema (GLONASS) system, a Compass (or BeiDou) system, a Galileo system, combinations thereof, or other types of global satellite navigation and/or positioning systems. In one aspect, one or more satellites 128(1)-128(n) may be, or may form, a part of a single or a dual GPS system. The one or more satellites 128(1)-128(n) may be operating in one or more of communication frequency bands known for satellite communications. The one or more satellites 128(1)-128(n) may include one or more transmission and reception antennas operating at down-link and uplink frequencies, power systems, navigation and control systems, etc. Internal structure of the one or more satellites 128(1)-128(n) is known and will not be described herein. The one or more satellites 128(1)-128(n) may be low-earth, medium-earth, or outer-space high altitude satellites, or combinations thereof. According to one aspect, the one or more satellites 128(1)-128(n) communicate with the machine 101. Such communication may occur over one or more communication paths each carrying respective one or more electromagnetic signals. For example, the one or more communication paths may be wireless communication paths, although other types of communication paths or channels (e.g., free space optical) in addition to, or along with, wireless channels may be present. It is to be noted that although FIG. 1 shows the one or more satellites 128(1)-128(n) communicating with the machine 101, the one or more satellites 128(1)-128(n) may communicate with other machines, for example, machines similar to the machine 101. Additionally or optionally, the one or more satellites 128(1)-128(n) may communicate with each other.

In one aspect, the adaptive control system 100 includes the base station 130 on, near or remote from the worksite 112. The base station 130 may include an antenna 132 for communication with the machine 101 and/or the GNSS 128. In one aspect, such communication may be through the first antenna 134 and/or the second antenna 136 on the machine 101. In one aspect, such communication may include data signals and control signals for processing by the adaptive controller 126. In one aspect, the base station 130 may include a control station or control room having one or more control consoles to operate the machine 101 remotely, or to exchange data and control information. The base station 130 may be mobile or a fixed structure that provides protective accommodation for an operator or user of the adaptive control system 100. In one aspect, the base station 130 may include a base controller of its own and a memory to store a reference model for the terrain of the worksite 112. Such a reference model may be updated as the operating conditions of the terrain change and provided to the processor 202. In one aspect, the base station 130 is optional.

Figure 2:
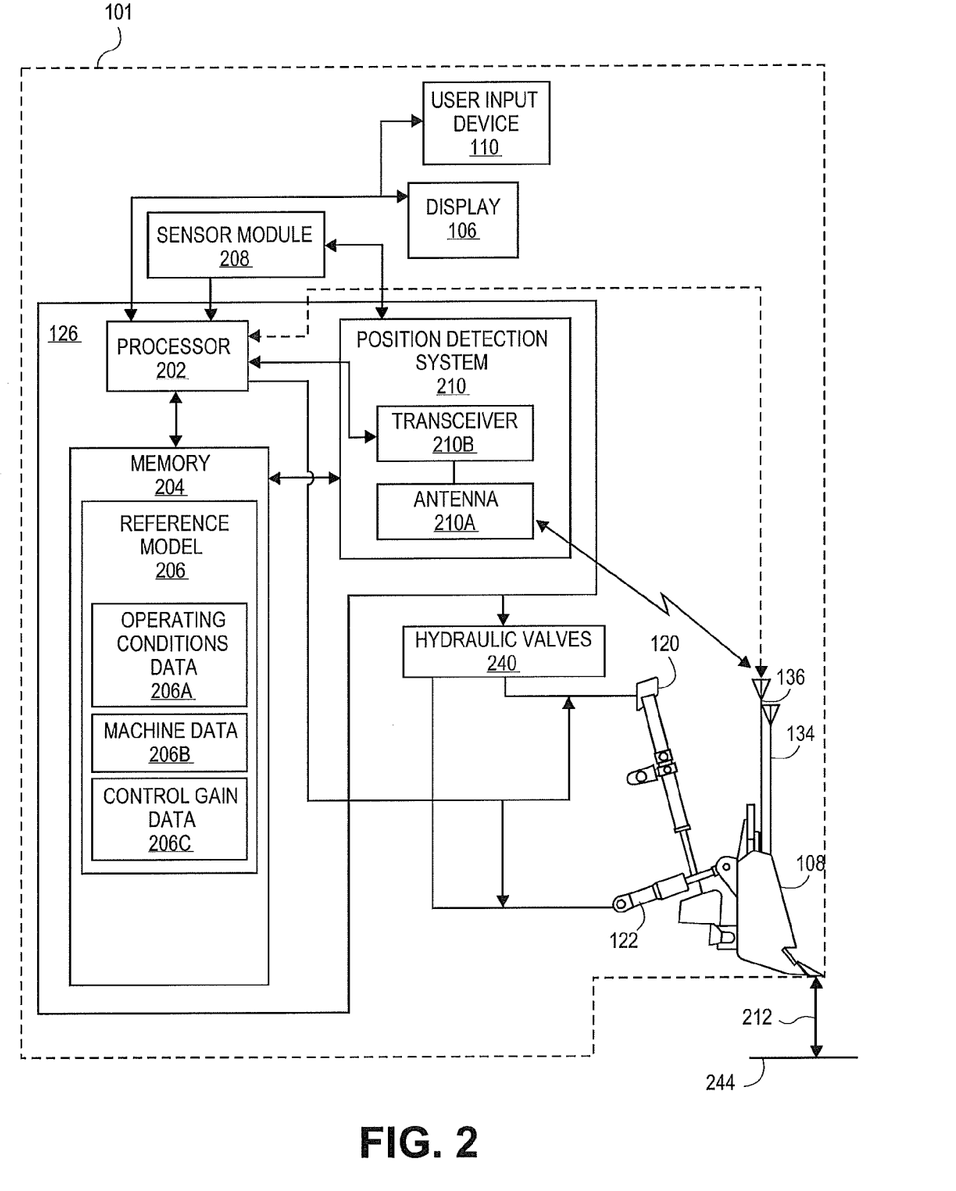
FIG. 2 illustrates an adaptive controller of the adaptive control system of FIG. 1, in accordance with an aspect of this disclosure.

FIG. 2 illustrates internal details of the adaptive controller 126 along with additional components of the machine 101 that interact with or are operatively or otherwise coupled to the adaptive controller 126. In one aspect, the machine 101 includes the sensor module 208. The sensor module 208 may include a load sensor, a speed sensor, an imaging sensor, and/or an implement position sensor. In one aspect, the load sensor of the sensor module 208 may include one or more torque sensors or pressure transducers or temperature sensors or the like, associated with the power source 102 of the machine 101 and configured to generate a load signal indicative of a loading condition of the machine implement 108. Alternatively, the load sensor may include strain gauges or pressure transducers coupled to the machine implement 108 and/or the hydraulic lift actuators 120 and hydraulic tilt actuators 122 to measure and quantify an amount of dirt/material carried by the machine implement 108. In some alternative aspects, the load sensor may include a system which estimates the loading condition of the machine implement 108 as functions of other measured parameters. Such load sensors are known by persons of ordinary skill in the art. The speed sensor of the sensor module 208 may be associated with the ground engaging mechanism 124, and configured to generate a speed signal indicative of a machine speed. In an alternative aspect, the speed sensor may be a system associated with a GPS system communicating with the GNSS 128 via the first antenna 134 and/or the second antenna 136, and may obtain a speed of the machine 101 during operation. Further, the implement position sensor of the sensor module 208 may be associated with the implement 108 and/or the hydraulic lift actuators 120 and hydraulic tilt actuators 122 and configured to generate an implement position signal indicative of a position of the machine implement 108. In one aspect, the imaging sensor of the sensor module 208 may be a camera placed on top of the cab 104 and used for obtaining or verifying a positioning of the machine implement 108. Since the respective structures of various sensors in the sensor module 208 are known to one of ordinary skill in the art, they are not being described herein.

In one aspect, the adaptive controller 126 includes the processor 202, a memory 204, and the position detection system 210 coupled to each other, for example, via electrical buses. It is to be noted that although the processor 202, the memory 204, and the position detection system 210 are illustrated in FIG. 2 as separate components, one of ordinary skill in the art will understand that two or more of the processor 202, the memory 204, and the position detection system 210, or respective functionalities thereof, may be integrated into a single structure. For example, the position detection system 210 may be a part of the processor 202.

The processor 202 may be an integrated circuit (IC) chip that is fabricated to implement various features and functionalities of the aspects discussed herein. By way of example only and not by way of limitation, the processor 202 may be fabricated using a Complementary Metal Oxide Semiconductor (CMOS) fabrication technology. In one aspect, the processor 202 may be implemented as an Application Specific Integrated Circuit (ASIC), a Field Programmable Gate Array (FPGA), a System-on-a-Chip (SOC), or the like. In one aspect, the processor 202 may have an on-chip antenna to communicate with the first antenna 134 and/or the second antenna 136. Such communication may communicate with the first antenna 134 and/or the second antenna 136 may occur via wired channel coupled to a base of the first antenna 134 and/or the second antenna 136. In one aspect, the processor 202 of the adaptive controller 126 is configured to carry out the operations discussed with respect to FIG. 3. In one aspect, the processor 202 is coupled to, and configured to communicate with, the user interface 110 and the display 106. In one aspect, the processor 202 is coupled to the memory 204 to obtain computer executable instructions stored in the memory 204 to implement the various features and functionalities of the various aspects of this disclosure. By way of example only and not by way of limitation, the processor 202 may be one of Intel® processors provided by Intel Corporation of Santa Clara, Calif.

According to an aspect of the present disclosure, the processor 202 of the adaptive controller 126 may direct the implement 108 to move to a desired implement position in response to a desired position signal received from the position detection system 210 and/or the sensor module 208. The desired position signal indicative of the automatically determined position of the machine implement 108 may include a desired elevation signal, such as, for example, a height 212 desired for the machine implement 108 above a plane 244 of the worksite 112. The desired position signal may include a desired tilt angle of the machine implement 108. In an aspect of the present disclosure, the processor 202 may process the desired position signal, the speed signal, the implement position signal, the imaging signal, and the load signal to output a machine control command to actuate the machine implement 108. As will be apparent to a person skilled in the art, the machine control command may include an electrical current of a determined magnitude, to actuate a hydraulic valves 240 associated with the hydraulic lift actuators 120 and hydraulic tilt actuators 122, respectively.

The position detection system 210 includes an on-chip antenna 210a in communication with the first antenna 134 and/or the second antenna 136 and coupled to a transceiver 210b. In one aspect, the position detection system 210 is coupled to the processor 202 and to the sensor module 208. In one aspect, the position detection system 210 is a global positioning system (GPS) chip such as that provided by Trimble Navigation, Ltd. of Sunnyvale, Calif. For example, the position detection system 210 may be a dual-GPS system. Alternatively, the position detection system 210 may be a light detection and ranging (LIDAR) system, a radio detection and ranging (RADAR) system, or other types of positioning systems known to those of ordinary skill in the art. It is to be noted that although only one antenna (i.e., the antenna 210a) is shown, the position detection system 210 may include more than one antenna, for example, an array of antennas. Further, the antenna 110a may be tunable to various frequencies depending upon which of the one or more satellites 128(1)-128(n), the first antenna 134, and/or the second antenna 136, the antenna 210a is communicating with. The antenna 210a is configured to receive one or more signals related to position and/or orientation of the machine implement 108 from the one or more satellites 128(1)-128(n), the first antenna 134, and/or the second antenna 136. Likewise, the antenna 210a may be configured to transmit one or more signals related to position and/or orientation of the machine implement 108 or the machine 101 to the one or more satellites 128(1)-128(n), and/or to the first antenna 134 and/or the second antenna 136. The one or more signals received by the antenna 210a are then forwarded to the transceiver 210b for further processing.

The transceiver 210b is coupled to the antenna 210a and includes transmitter and receiver circuitry (not shown) to process the one or more signals received by the antenna 210a. The transceiver 210b may further include analog to digital converters (ADCs), digital to analog converters (DACs), oscillators, filters, amplifiers, mixers, and other components (not shown) of a transmitter-receiver circuit, as known. An output of the transceiver 210b may be coupled to the processor 202 of the adaptive controller 126.

In one aspect, the memory 204 is a non-transitory tangible computer readable memory. By way of example only, the memory 204 may be a semiconductor based memory device including but not limited to random access memory (RAM), read only memory (ROM), Dynamic RAM, Programmable ROM, or other types of memory devices known to one of ordinary skill in the art. In one aspect, the memory 204 is coupled to the processor 202 and to the position detection system 210. In one aspect, the memory 204 may include non-transitory computer readable storage medium on which computer executable instructions reside, which instructions when executed by the processor 202 cause the processor 202 to carry out the features and functionalities of the various aspects of this disclosure, such as those discussed with respect to FIG. 3. Such non-transitory computer readable storage medium may include semiconductor memory, optical memory, magnetic memory, mono- or bi-stable circuitry (flip-flops, etc.) and the like, or combinations thereof. Such non-transitory computer readable storage medium excludes signals that are transitory.

In one aspect, the memory 204 stores the reference model 206. The reference model 206 includes operating conditions data 206a, machine data 206b, and controller gain data 206c. In one aspect, the reference model 206 is a function of a target grade or topography that is to be implemented using the machine 101 on the worksite 112. For example, the reference model 206 may include parameters or data related to a targeted grade profile of the worksite 112 received from a costumer. Such a grade profile may be associated with the type of worksite 112 such as a highway, a golf-course, a mining site, or other types of sites, each having its unique reference model 206 describing the grade control and other operating conditions associated therewith. In one aspect, the reference model 206 may be used by the processor 202 to determine the difference between the actual machine data 206b and an ideal response to the actual machine data 206b by the machine implement 108 as well as to the control parameters stored as the control gain data 206c. In one aspect, the reference model 206 may not directly include the control gain data 206c, which control gain data 206c may be part of a separate control module (not shown) within adaptive controller 126.

In one aspect, the operating conditions data 206a include data related to a type of material making the terrain, a dryness factor of the terrain, one or more disturbances present in the terrain (e.g., waves or undulations), and/or other geographical patterns of the terrain of the worksite 112. Such operating conditions data 206a may be part of a database in which operating conditions related to a plurality of terrains of the worksite 112 are stored. In one aspect, the reference model 206 may include a state predictor for the adaptive controller 126 as part of the operating conditions data 206a. By way of example only, such a state predictor may be the desired dynamics of the adaptive control system 100 (e.g., appropriate machine speed, appropriate terrain operating conditions, etc.) to which the processor 202 should control the machine implement 108's position. The state predictor may include the difference between the actual machine data 206b and the ideal response and function of the desired target that a customer who wishes to have the worksite 112 modified by the machine 101 requires.

In one aspect, the operating conditions data 206a may include simulation data to form an initial state of the reference model 206 that simulates a terrain of the worksite 112, as discussed with respect to FIGS. 3-8. To reflect the actual operating conditions and dynamics of the terrain of the worksite 112, such operating conditions data 206a is updated by the processor 202 based upon information from the sensor module 208 and/or the position detection system 210 regarding the actual operating conditions of the terrain of the worksite 112. In one aspect, the processor 202 may carry out an adaptive control analysis using the $L_k$ norm, where k is an integer in the range $[1, \infty]$, as may be understood by one of ordinary skill in the art in view of the present disclosure. The $L_k$ norm is applied to compare the deviation of the actual operating conditions data from the target or reference data stored in the reference operating conditions data 206a based upon changing conditions of the terrain of the worksite 112. That is, different types of terrain or different operating conditions data 206a associated with the same terrain may be analyzed and updated in real time as the machine 101 moves over the worksite 112. The $L_k$ norm may be applied to compare the deviation of the actual operating response of the machine implement 108 from the desired response generated from the reference model 206 based upon changing operating conditions of the terrain of the worksite 112. The controller parameters in the control gain data 206c are updated in real time as the machine 101 moves over the worksite 112 to adapt to different operating conditions.

In one aspect, the machine data 206b may include a machine speed, a machine implement depth, a load weight, and tilt information for the machine implement 108. The machine data 206b may be used by the adaptive controller 126 to update the control gain data 206c. For example, if the machine speed of the machine 101 is more than that required for a particular grade control value for the worksite 112, then the processor 202 may provide output signals to the ground engaging mechanism 124 and/or the user interface 110 to adjust the speed of the machine 101 (and hence that of the implement 108) relative to the worksite 112. Likewise, if the load on the machine implement 108 is more than that permissible for a material making the terrain, then the processor 202 may adjust the control gain data 206c such that hydraulic valves 240 send a signal to reduce some load on the machine implement 108. In one aspect, the machine data 206b may store data specific to different types of machines that may be used on different worksites by the processor 202.

In one aspect, the control gain data 206c may include a plurality of gain coefficients that control the movement and/or position of the machine implement 108. Depending on the reference model 206 and the height 212 of the machine implement 108 above the plane 244, the control gain data 206c can be adjusted to match the reference model 206. For example, if the height 212 is more than (or less than) a target height stored in the reference model 206, the control gain data 206c may be adjusted to adjust the height 212 and hence a position of the machine implement 108. Likewise, instead of or in addition to the height 212, a tilt or angle of the machine implement 108, or a swivel angle of the machine implement 108, or both, could be adjusted by the processor 202 by updating the reference model 206 and/or the control gain data 206c. In one aspect, the control gain data 206c may be adjusted in accordance with a control law (not shown), stored in the memory 204. It is to be noted that the adjustment of the control gain data 206c is in addition to and/or independent of the adjustment of the operating conditions data 206a by the processor 202, as discussed. For example, the control gain data 206c may be adjusted based upon instantaneous reference values of the operating conditions data 206a, which are further updated by the parameters or values describing the actual operating conditions. The final adaptive control of the machine implement 108 using the adaptive controller 126 is a combination of both the adjusted position of the machine implement 108 as well as the updated reference model 206 having the updated operating conditions data 206a.

A desired or target position of the machine implement 108 may be based on the operating conditions data 206a, the machine data 206b, and the control gain data 206c stored in the reference model 206. The reference model 206 may include data related to a construction surface of the worksite 112 based on an engineering design. The construction surface provided in the reference model 206 may represent a ground profile indicative of an irregular three-dimension (3D) surface or a flat plane. As illustrated in FIG. 2, the construction surface or terrain of the worksite 112 has the design plane 244 that represents a desired cutting plane or a final grade for the worksite 112. For example, the processor 202 may be configured to determine a relative desired location or position of the machine implement 108 with respect to the design plane 244. Moreover, the processor 202 may be configured to determine a relative location or position of the machine 101 within the worksite 112. The relative location or position of the machine 101 and/or the implement 108 may be determined using one or more position sensors in the sensor module 208, GPS receivers, and/or laser systems, and the like, in the position detection system 210, which are known to one of ordinary skill in the art.

According to another aspect of the present disclosure, the processor 202 of the adaptive controller 126 may also direct the machine implement 108 to move to an operator determined position in response to an operator input signal received from the user interface 110. The operator determined position is indicative of a position representing an operator's desired movement of the machine implement 108. The operator input signal may also include an elevational signal, such as, for example, a lower implement signal or a raise implement signal. The operator inputs signal indicative of the operators' desired movement of the machine implement 108 may also include a tilt signal, such as, for example, tilt left and tilt right signals. In an aspect of the present disclosure, the adaptive controller 126 may process the operator input signal and the load factor received from the machine data 206b to output the machine control command to move the machine implement 108. The processor 202 may indicate the difference between the desired and the actual position of the machine implement 108 based upon the adaptive control method discussed with respect to FIGS. 3-8.

In one aspect, the reference model 206 may be provided from an external source, e.g., an online model stored in a controller outside the machine 101, e.g., at the base station 130. In one aspect, the adaptive controller 126, the power source 102, the hydraulic valves 240, the hydraulic lift actuators 120, the hydraulic tilt actuators 122, and the machine implement 108 form a forward path of a control loop, although some of these components may be optional or the forward path may include additional components. An output of this control path is the movement or positioning of the machine implement 108 or components thereof (e.g., a blade or the cutting edge 114). The feedback path of the control loop includes data related to not only the output in terms of the movement or positioning of the machine implement 108 (provided, e.g., by the position detection system 210 using the GNSS 128 and/or the first and the second antennas 134, 136), but additionally, the operating conditions provided to the adaptive controller 126 (e.g., operating conditions data 206a and/or machine data 206b). It is a combination of these two feedback paths (movement/positioning and operating conditions of the terrain) that are used to change the control gain data 206c, and used to adaptively update the reference model 206 (e.g., the operating conditions data 206a) using the $L_k$ norm adaptive control technique. Further, as discussed, the updated reference model 206 is used to change or adapt the control gain data 206c, which further changes the power output by the power source 102, and hence changes or adapts the movement or positioning of the machine implement 108 until it matches a desired or target movement or positioning stored in the initial reference model 206 and supplied, e.g., by a customer or from a simulation of the terrain of the worksite 112. The desired or target movement or positioning is specific to specific terrains having respective operating conditions.

Furthermore, in one aspect, the adaptive controller 126 is adapted to receive the operator input signal generated by the user interface 110, and generate a machine control command to move the machine implement 108 to the operator determined position or pre-determined target position, respectively. Thus, the machine control command actuates the hydraulic lift actuators 120 and hydraulic tilt actuators 122 to move the implement 108 to the corresponding target position. Moving the implement 108 may include a cut to the corresponding target position or a lift to the corresponding target position.

INDUSTRIAL APPLICABILITY

An aspect of the present disclosure is applicable generally to control systems and methods and, more particularly, to an adaptive control method for controlling positioning of machine implements (e.g., the machine implement 108). Conventionally, grade control systems use the classical PD (Proportional Derivative) controller, or other types of proportional controllers. These conventional controllers require frequent tuning when the operation conditions change for different terrains. The aspects of the present disclosure overcome these drawbacks.

Figure 3:
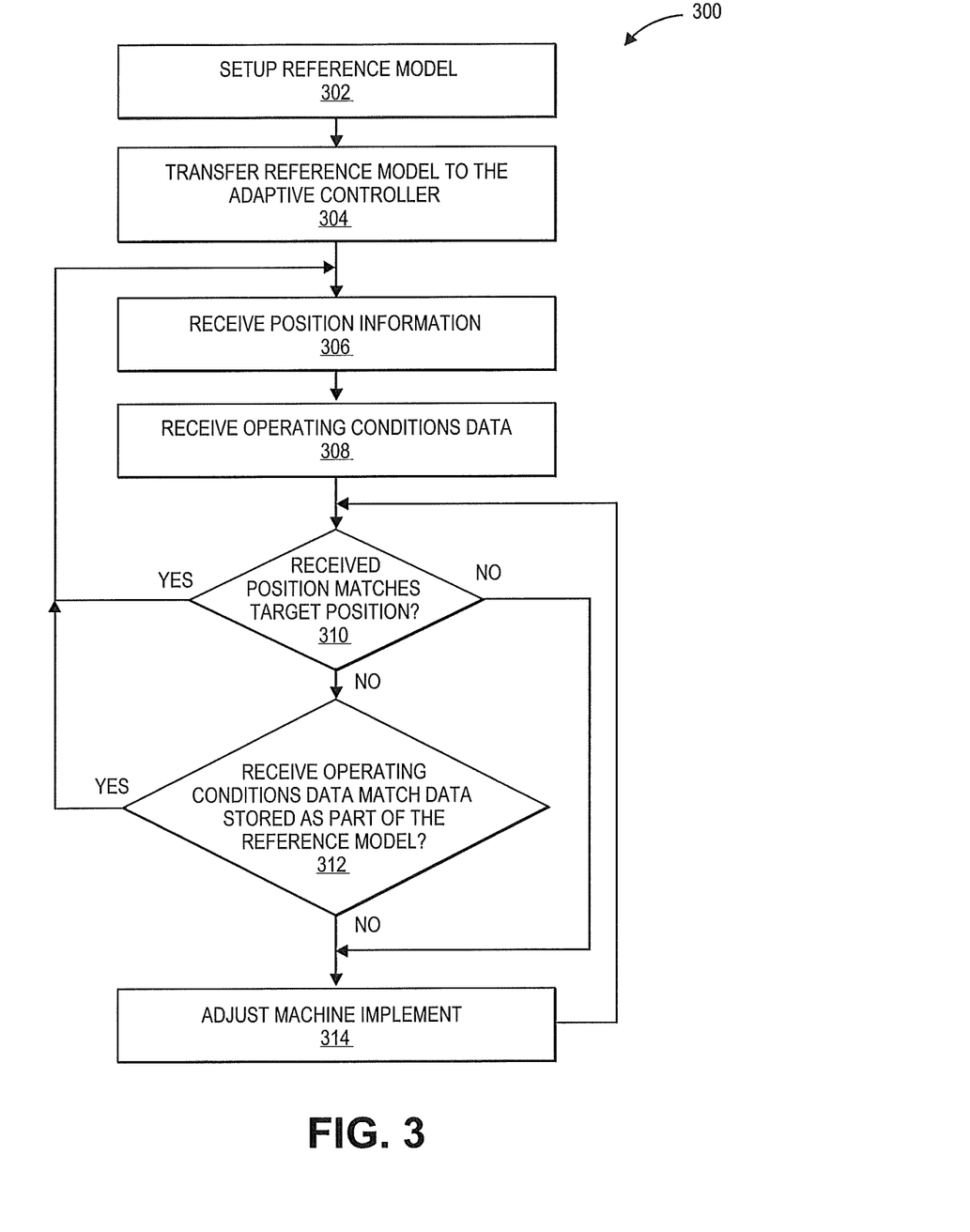
FIG. 3 illustrates a method for adaptive control using the adaptive control system of FIG. 1, in accordance with an aspect of this disclosure.
Figure 4:
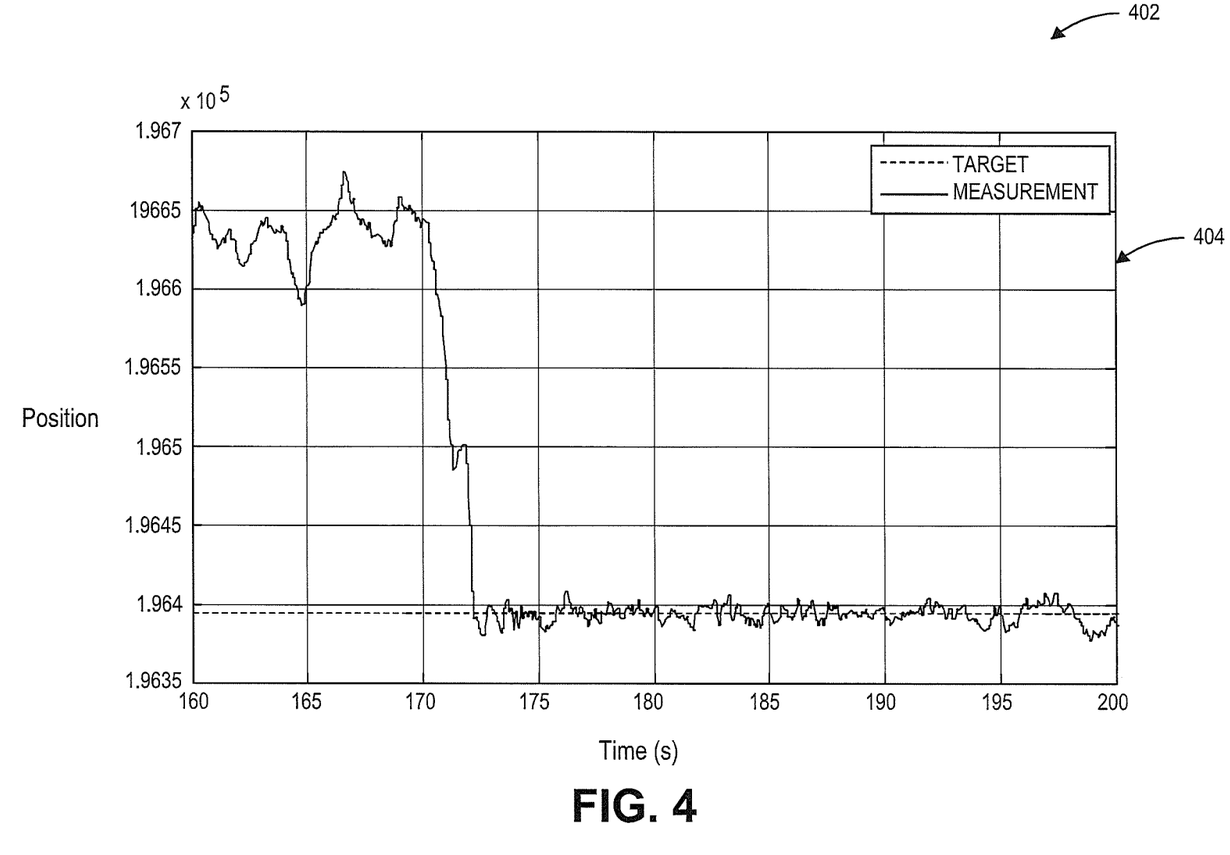
FIG. 4 illustrates an automatic gain tuning for the method of FIG. 3, in accordance with an aspect of the disclosure.

FIG. 3 presents a flowchart of a process or method 300 for adaptive control of the machine implement 108, according to an aspect of the disclosure. One or more processes of the method 300 of may be skipped or combined as a single process, repeated several times, and the flow of operations in the method 300 may be in any order not limited by the specific order illustrated in FIG. 3. For example, various operations may be moved around in terms of their respective orders, or may be carried out in parallel with one or more other operations. Further, the functioning or functionalities of the adaptive control system 100 are not affected by an order in which the aspects discussed in FIGS. 3-8 are implemented, and such an order of implementation is by way of example only and not by way of limitation.

The method 300 may begin in an operation 302 where the processor 202 may create or setup the reference model 206. In one aspect, the processor 202 may setup a plurality of such reference models for different types of terrains for different worksites. For example, the reference model 206 for grading a golf course may be different from the reference model 206 for grading a highway surface. In one aspect, the processor 202 may generate a three-dimensional (3-D) visual model or visualizations of the terrain and include the 3-D visualization as part of the reference model 206. The setup in the operation 302 is further discussed with reference to FIGS. 4-8 where an exemplary setup process flow is discussed. As part of the setup operation 302, in an operation 402, the control gain data 206c is generated by the processor, such control gain data 206c may include carrying out an automatic gain tuning for various gains associated with the adaptive controller 126. Such gain tuning may be carried out using particle swarm optimization ("PSO") techniques that include steps of initialization of a number of particles, number of gains and their types, a number of iterations for which the gain tuning is to be performed by the processor 202, a resolution or accuracy desired, and an initial value of the various parameters for gain tuning. The PSO further includes a simulation of propagation of particles on the machine implement 108 and a determination of a cost function for optimization. Finally, the PSO may include the processor 202 checking each iteration by comparing the cost function at each iteration of the PSO with the cost function of the previous iteration and updating the cost function based upon the comparison. It is to be noted that although PSO is described herein, other types of optimization techniques to setup the initial reference model 206, such as genetic algorithm techniques known to one of ordinary skill in the art, may be applied using the processor 202. In one aspect, the control gains may be control parameters stored as part of the control gain data 206c. In the real time updation of the reference model 206, the control gain in the control gain data 206c is tuned by one or more control law. The PSO method may be used for offline tuning procedure to find some of the constant parameters for the control law. In one aspect, the PSO technique may be used online at the calibration phase for a factory when the machine 101 is available for the first time. A plot 404 showing target position versus measured position for the adaptive control of the machine implement 108 with respect to time. The data from the validation may be further used to reiterate the PSO step(s).

Figure 5:
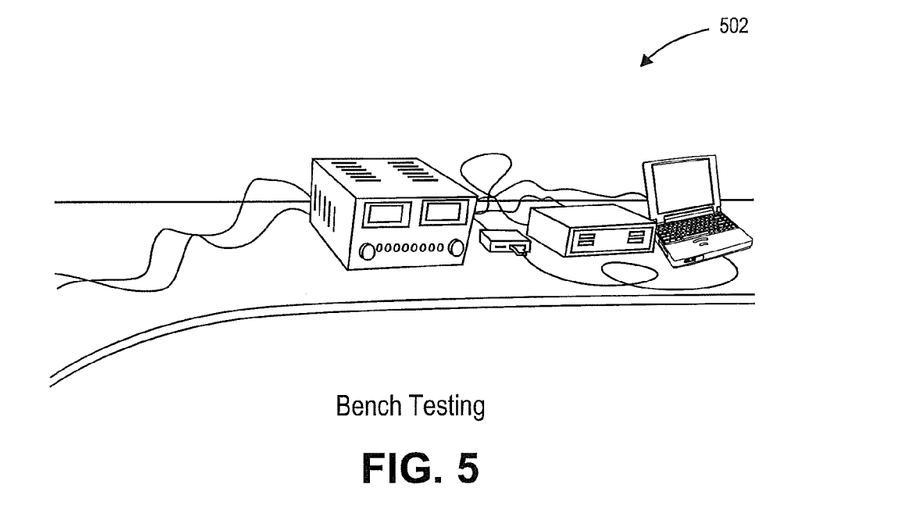
FIG. 5 illustrates a bench test operation for the method of FIG. 3, in accordance with an aspect of the disclosure.
Figure 6:
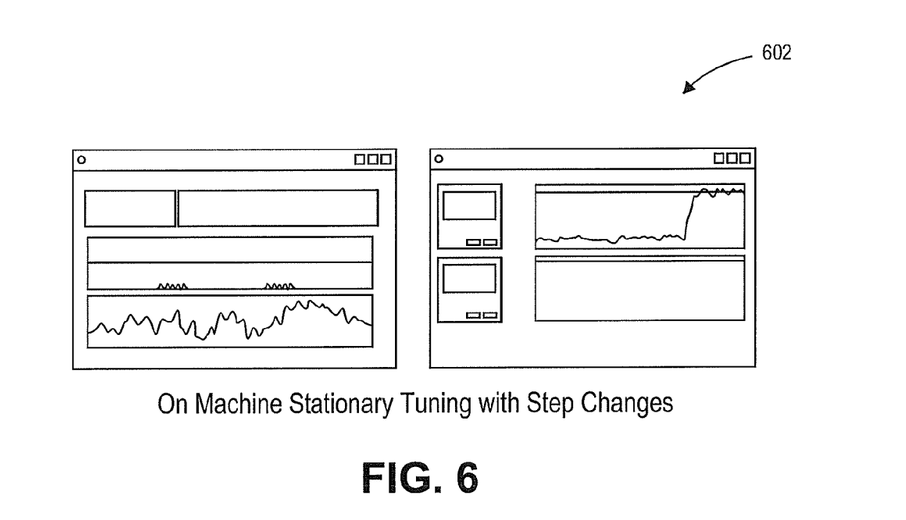
FIG. 6 illustrates an on-machine stationary tuning for the method of FIG. 3, in accordance with an aspect of the disclosure.
Figure 7:
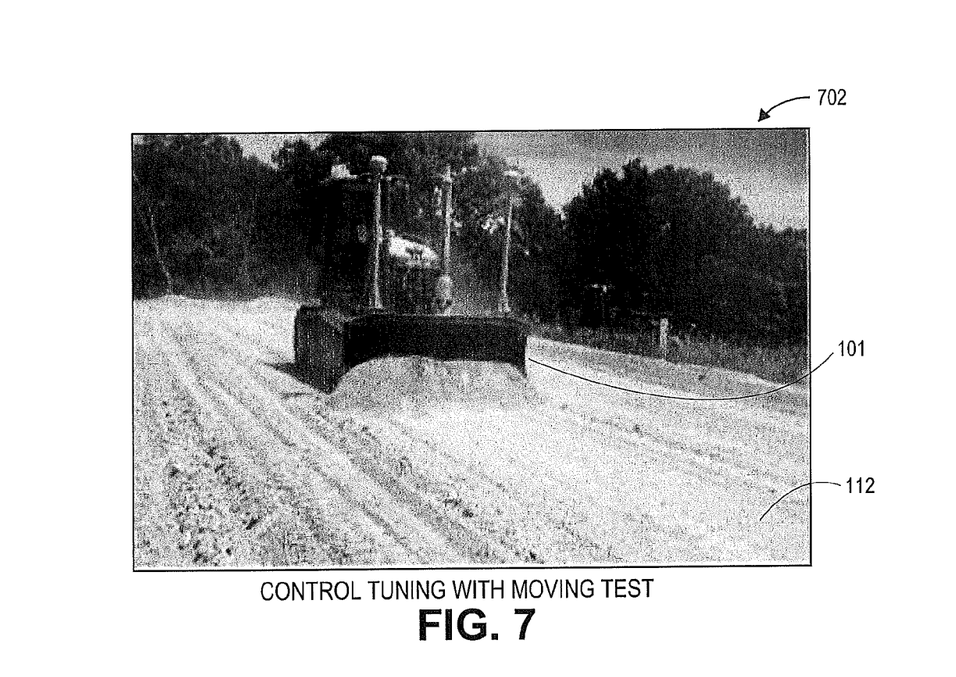
FIG. 7 illustrates a moving test for the adaptive controller of FIG. 2 used per the method of FIG. 3, in accordance with an aspect of the disclosure.

In one aspect, as part of the setup operation 302, the data gathered by the processor 202 in the operation 402 and stored in the memory 204 may be used in an operation 502 shown in FIG. 5 for bench testing a prototype of the machine implement 108. In the operation 502, a prototyping environment may be created and the results of the bench testing operation 502 may be stored in the memory 204. Alternatively, such results may be stored directly to a flash memory and transferred to adaptive controllers (e.g., the adaptive controller 126) on different machines (e.g., machines similar to the machine 101). In one aspect, with the bench test data from the operation 502, in an operation 602 shown in FIG. 6, stationary tuning of the reference model 206 is carried out. The term "stationary tuning" may relate to the machine 101 being stationary, idling, or not moving. Various machine data 206b are generated or updated from the stationary tuning. In one aspect, the machine data 206b may be monitored for step changes (incremental, decremental, or both) to various parameters. For example, the machine implement 108 may be moved up and down to vary the height 212. Such variation in height may be calibrated based upon data from the sensor module 208 and/or the position detection system 210. For example, when the position detection system 210 is a GPS system, the first antenna 134 and/or the second antenna 136 may provide accurate position of a blade of the machine implement 108 at the height 212 from the plane 244 of the worksite 112.

In one aspect, as part of the setup operation 302, using the machine data 206b obtained in the operation 602, the processor 202 may carry out offline simulation to further tweak the reference model 206. In one aspect, once the offline simulation data is stored in the memory 204, the adaptive controller 126 is further tuned with the machine 101 moving on a terrain of the worksite 112, as illustrated in an operation 702 shown in FIG. 7, where machine speed, machine load, etc. are obtained as part of the machine data 206b. Such a moving test with the machine 101 may be carried out on the actual terrains of one or more worksites (e.g., the worksite 112) may be further used to update or refine the setup operation 302 of the reference model 206.

Figure 8:
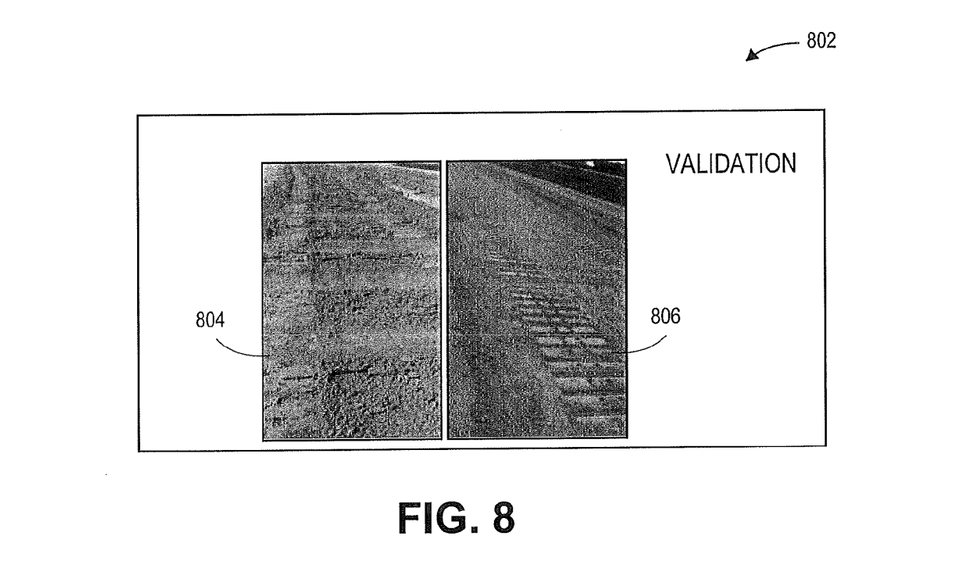
FIG. 8 illustrates a controller validation step for the method of FIG. 3, in accordance with an aspect of the disclosure.

In one aspect, in an operation 802 shown in FIG. 8, a validation of the adaptive controller 126 is carried out with different running conditions. The term "validation" may refer to using the adaptive controller 126 on the machine 101 and validating the adaptive controller 126 with different running conditions for the worksite 112. For example, such running conditions may include testing the machine 101 to run on two different types of terrains 804 and 806. The validation data from the operation 802 may be shown in the plot 404 showing target position versus measured position for the adaptive control of the machine implement 108 with respect to time. The data from the validation may be further used to reiterate the PSO step(s) in the operation 402 discussed with respect to FIG. 4.

Referring back to FIG. 3, in an operation 304, once the initial reference model 206 is setup, the reference model 206 may be transferred to the adaptive controller 126 or to a controller in the base station 130 (e.g., for remote controlled operation of the machine 101). In one aspect, as discussed, the reference model 206 may be transferred into the memory 204. Alternatively, the reference model 206 may be an online reference model available to the adaptive controller 126 from a remote server (not shown). In one aspect, the reference model 206 is used by the adaptive controller 126 to correct the predict error in positioning the machine implement 108 from uncertain operating conditions of various terrains of the worksite 112. The predict error is the error between the output from the reference model 206 and actual machine output from the machine implement 108 in terms of the movement of the machine implement 108, or in terms of the power provided by the power source 102, or both.

In an operation 306, the processor 202 of the adaptive controller 126 may receive a position information of the machine implement 108. For example, such position information may be obtained from one or more signals received from the first antenna 134 and/or the second antenna 136. In one aspect, the position information may be accurate within a tolerance or accuracy of ±1 cm from the actual position of the machine implement 108. In one aspect, the first antenna 134 and/or the second antenna 136 may directly provide the position information (e.g., the height 212) to the processor 202, wirelessly or otherwise. In one aspect, such position information may be provided as part of GPS information from the GNSS 128. Alternatively or additionally, in one aspect, the processor 202 may receive the position information from one or more sensors in the sensor module 208.

In an operation 308, the processor 202 receives operating conditions associated with the worksite 112. Such operating conditions may be available through sensor module 208, or through the user interface 110. The current or actual operating conditions and reference operating conditions may be displayed on the display 106, e.g., from the operating conditions data 206a. As discussed, the operating conditions may indicate a plurality of parameters associated with the terrain of the worksite 112 including but not limited to the dryness or wetness of the terrain, the disturbances present in the terrain, the material type or surface type of the terrain, a blade depth permissible or possible for the terrain, a machine load and speed for the terrain, and a presence of undulations or waves in the terrain, etc.

In an operation 310, the processor 202 compares the position information with a target position desired for the machine implement 108. The target position may be stored in the memory 204 accessible to the processor 202. For example, the target position may be a specific height that a blade of the machine implement 108 should be at (e.g., the height 212), a specific tilt angle provided by the first antenna 134 and/or the second antenna 136 of the blade of the machine implement 108, and/or a specific swivel or rotation angle of the machine implement 108 away from or towards the machine 101. In one aspect, the processor 202 may carry out such a comparison using position information provided by the sensor module 208.

In an operation 312, the processor 202 compares the operating conditions of the terrain of the worksite 112 with the operating conditions data 206a stored in the reference model 206. For example, the operating conditions data 206a may be obtained from the initial setup step of the reference model 206 as discussed with respect to the operation 302. Alternatively, the operating conditions data 206a may be associated with reference values or desired values for the operating conditions and may be presented, e.g., as part of a graphical user interface (GUI) on the display 106. The processor 202 may use the L1 norm as a performance index to compare the actual operating conditions and dynamics of the terrain of the worksite 112 with the reference model 206 stored in the memory, although higher L-norms could be used. The processor 202 may then update the reference model 206 to create an updated reference model based upon the actual operating conditions. This updating may be carried out based upon a minimization of an absolute error in the operating conditions data 206a when compared with the actual operating conditions according to an $L_k$ norm, as discussed. In one aspect, such updating may be carried out iteratively until the reference model 206 reflects the actual operating conditions up to a desired point based upon the accuracy of the grade control required for the terrain of the worksite 112.

In an operation 314, the position of the machine implement 108 is adjusted based upon the comparisons carried out in the operations 308 and 310 and based upon the updated operating conditions 206a of the updated reference model 206. In this sense, the adaptive controller 126 is adaptive since the reference model 206 is automatically tuned based upon the actual operating conditions, and the update reference model 206 is then used to adjust the machine implement 108's position, as opposed to only using a fixed reference model for a particular terrain in a closed feedback loop and then adjusting the position of the machine implement 108 based upon that fixed reference point. In one aspect, the updated reference model 206 is used to change the control gain data 206c, which is then used by the processor 202 to control the position of the machine implement 108. The adaptive controller 126 having the reference model 206 online to dynamically correct the predict error (i.e., the error between the desired dynamic response and machine 101's actual response) from the uncertain conditions of the worksite 112. The adaptive controller 126 is configured to correct the tracking error from the target response desired by the machine 101. The adaptive controller 126 is adjusted based on a control law and the position of the machine implement 108 is then adjusted based, for example, on such a control law. The final result is to make the position of the machine implement 108 (e.g., a blade position) to track the desired target position and have a consistent performance without tuning the adaptive controller 126 at different operation conditions (dry/wet, different materials, different load/speed, etc.) and on different machines.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. An adaptive control system for a machine implement, comprising:
    a machine implement of a machine; and
    an adaptive controller operatively coupled to the machine implement, said adaptive controller including a processor configured to:
        create a reference model of a terrain including one or more reference operating conditions associated with the terrain;
        receive a position of the machine implement relative to the terrain from at least one position detection system;
        receive data regarding operating conditions of the terrain;
        compare the position with a target position stored in a memory;
        compare the data regarding the operating conditions with data stored in the reference model of the terrain stored in the memory;
        update the reference model based upon a change in the operating conditions; and
        adjust the position of the machine implement based upon the comparisons and based upon an updated reference model of the operating conditions of the terrain,
    wherein the processor is configured to update the reference model using an L1 norm, the processor being configured to compare the data regarding the operating conditions using the L1 norm.

2. The adaptive control system of claim 1, wherein the position of the machine implement is indicated by at least one of a height of the machine implement from the terrain, a tilt of the machine implement from the terrain, and an angular orientation of the machine implement with respect to the terrain.

3. The adaptive control system of claim 1, wherein the machine implement includes a blade for grading the terrain.

4. The adaptive control system of claim 1, wherein the operating conditions are provided to the processor by one or more sensors on the machine, the operating conditions including at least one of a type of material making the terrain, a dryness factor of the terrain, one or more disturbances present in the terrain, and a geographical pattern of the terrain.

5. The adaptive control system of claim 1, wherein the processor is configured to receive the position of the machine implement within an accuracy of ±1 cm from two GPS antennas of a dual-GPS system.

6. The adaptive control system of claim 1, wherein the processor is configured to adjust a gain of the adaptive controller to adjust the position of the machine implement using the updated reference model.

7. The adaptive control system of claim 1, wherein the processor is configured to receive the reference model including reference operating conditions from a base station.

8. The adaptive control system of claim 1, wherein the adaptive controller is removeably attached to the machine.

9. An adaptive control method for a machine implement, the adaptive control method comprising:
creating, at an adaptive controller, a reference model of a terrain including one or more reference operating conditions associated with the terrain
receiving, at the adaptive controller, a position of the machine implement relative to the terrain from at least one position detection system;
receiving, at the adaptive controller, data regarding operating conditions of the terrain;
comparing, at the adaptive controller, the position with a target position stored in a memory;
comparing, at the adaptive controller, the data regarding the operating conditions with data stored in the reference model of the terrain stored in the memory;
updating, at the adaptive controller, the reference model based upon a change in the operating conditions; and
adjusting, at the adaptive controller, the position of the machine implement based upon the comparisons and based upon an updated reference model of the operating conditions of the terrain,
wherein the updating the reference model is carried out using an L1 norm, and the comparing the data regarding the operating conditions using the L1 norm.

10. The adaptive control method of claim 9 further comprising:
indicating, at the adaptive controller, the position of the machine implement by at least one of a height of the machine implement from the terrain, a tilt of the machine implement from the terrain, and an angular orientation of the machine implement with respect to the terrain.

11. The adaptive control method of claim 9, wherein the machine implement includes a blade for grading the terrain.

12. The adaptive control method of claim 9, wherein the operating conditions are provided to the adaptive controller by one or more sensors on the machine, the operating conditions including at least one of a type of material making the terrain, a dryness factor of the terrain, one or more disturbances present in the terrain, and a geographical pattern of the terrain.

13. The adaptive control method of claim 9, wherein the receiving the position of the machine implement includes receiving the position within an accuracy of ±1 cm from two GPS antennas of a dual-GPS system.

14. The adaptive control method of claim 9 further comprising:
adjusting, at the adaptive controller, a control gain to adjust the position of the machine implement using the updated reference model.

15. The adaptive control method of claim 9 further comprising:
receiving, at the adaptive controller, the reference model including reference operating conditions from a base station separate from the machine.

16. An adaptive controller, comprising:
a processor; and
a memory coupled to the processor, the memory including computer executable instructions thereupon, which computer executable instructions when executed by the processor cause the processor to:
create a reference model of a terrain including one or more reference operating conditions associated with the terrain;
receive a position of the machine implement relative to the terrain from at least one position detection system;
receive data regarding operating conditions of the terrain;
compare the position with a target position stored in a memory;
compare the data regarding the operating conditions with data stored in the reference model of the terrain stored in the memory;
update the reference model based upon a change in the operating conditions; and
adjust the position of the machine implement based upon the comparisons and based upon an updated reference model of the operating conditions of the terrain,
wherein the processor is configured to update the reference model using an L1 norm, the processor being configured to compare the data regarding the operating conditions using the L1 norm.

* * * * *